M. GLASER & B. WAINBLATT.
APPARATUS FOR SILVERING GLASS PLATES.
APPLICATION FILED JUNE 18, 1908.
952,191.
Patented Mar. 15, 1910.
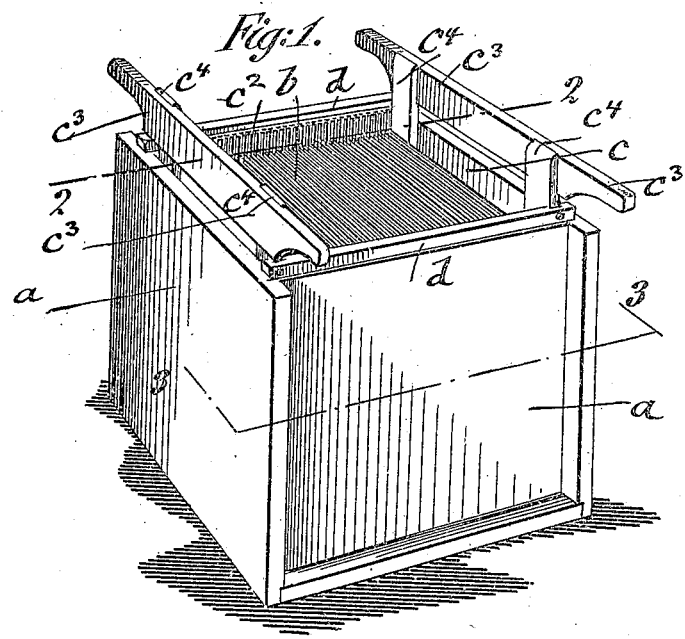
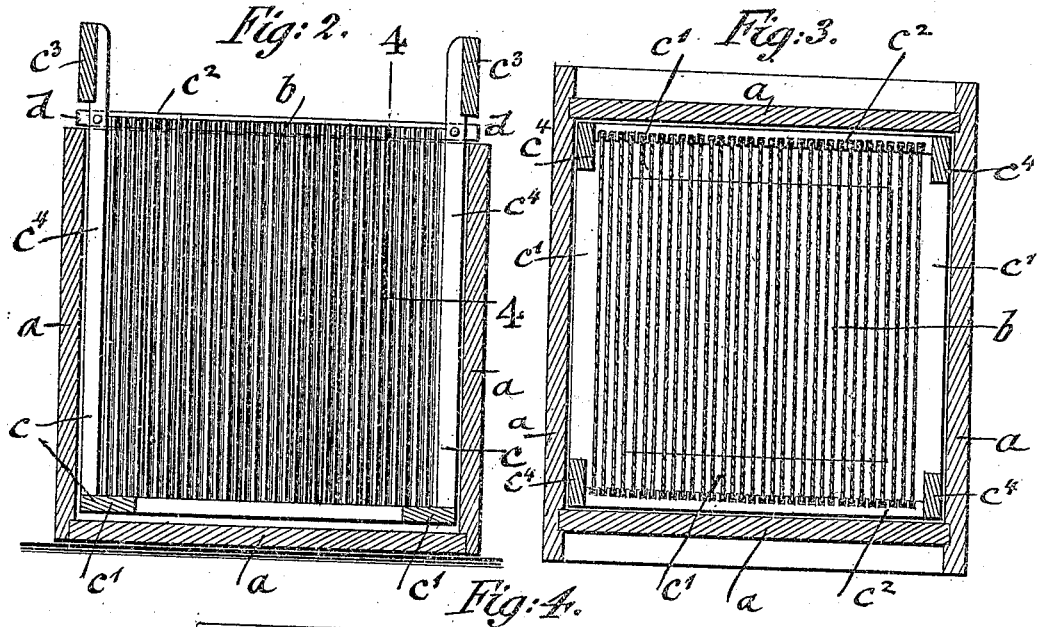

UNITED STATES PATENT OFFICE.

MANUEL GLASER AND BANY WAINBLATT, OF NEW YORK, N. Y., ASSIGNORS, BY MESNE ASSIGNMENTS, TO AMERICAN LOOKING-GLASS CO., OF NEW YORK, N. Y., A CORPORATION OF NEW YORK.

APPARATUS FOR SILVERING GLASS PLATES.

952,191.  Specification of Letters Patent.  Patented Mar. 15, 1910.

Application filed June 18, 1908. Serial No. 439,158.

*To all whom it may concern:*

Be it known that we, MANUEL GLASER and BANY WAINBLATT, both subjects of the Czar of Russia, residing at New York, in the borough of Manhattan, county and State of New York, have invented certain new and useful Improvements in Apparatus for Silvering Glass Plates, of which the following is a specification.

This invention relates to an improved apparatus for silvering glass plates by suspending a plurality of plates in upright position at the same time in the silvering solution, instead of depositing the layer on the plates individually while in horizontal position; and the invention consists of an apparatus for silvering glass-plates which comprises an exterior tank for the silvering solution and a removable frame-box provided with transverse handle-bars at the upper part, an open top, framed bottom and vertical guide-grooves in the side-walls of the frame-box for inserting a number of glass-plates transversely thereto, so that all the plates are submerged at one time into the silvering solution tank and removed together after the silvering layer is deposited thereon.

In the accompanying drawings, Figure 1 represents a perspective view of our improved apparatus for silvering glass-plates, Fig. 2 is a vertical transverse section through the frame-box for receiving the glass-plates, on line 2, 2, Fig. 1, Fig. 3 is a horizontal section on line 3, 3, Fig. 1, and Fig. 4 is a vertical section on line 4, 4, Fig. 2, through the tank and frame-box.

Similar letters of reference indicate corresponding parts.

Referring to the drawings, $a$ represents a waterproof tank which is made of wood, metal or other suitable material. The tank is preferably made of rectangular shape, and filled with a solution of the silvering compound, any approved silvering material being employed. A frame-box $c$ is supported in the tank $a$ and in the frame-box are inserted a plurality of glass-plates $b$ which after the backs have been polished, cleaned, chemically washed and treated with chlorid of tin are submerged for the required length of time in the silvering solution until a uniform layer is formed on the prepared rear-surface of the glass-plates. No coating or very little, is deposited on the face side of the glass, because the glass has purposely not been sufficiently cleaned. If any deposit at all is made, it can be easily washed off. The frame-box $c$ is composed of a framed-bottom $c^1$, vertically-grooved parallel side-walls $c^2$ in which the glass-plates are supported and transverse handle-bars $c^3$ which are attached to the upper ends of uprights $c^4$ that are attached to the bottom and side-walls, the handle-bars forming at the same time the transverse connection for the side-walls of the frame-box.

The frame-box, containing the glass-plates inserted in the same, is taken hold of by two men at the handles, lifted and then lowered into the tank $a$ until the glass-plates to be silvered after their backs have been polished, cleaned and chemically washed, are entirely submerged in the silvering solution. The glass-plates remain in the solution until the silver has coated evenly the rear surfaces of the glass-plates, after which the frame-box is removed by lifting it out of the tank by means of the handles, so as to allow the solution to flow off after which the silvered plates are permitted to dry. To the upper edges of the side-walls of the frame $c$ are attached cleats $d$ which allow the frame-box to rest on the opposite upper edges of the tank $a$ and support it in position so that the solution can readily pass along up both sides from the bottom upward in the space between the glass-plates and frame-box and surround the same entirely. The glass-plates remain in the solution until they have received an even deposit of silver on their rear surfaces. As any number of plates can be inserted at the same time according to the sizes of tank and frame-box, the process of silvering is considerably facilitated, expedited and cheapened as the handling of each individual glassplate in silvering the same is done away with.

Having thus described our invention, we claim as new and desire to secure by Letters Patent:

In an apparatus for silvering glass plates, the combination of a tank for receiving the silvering solution and a glass-plate supporting frame-box consisting of a rectangular bottom frame, upright pieces secured to the corners of said bottom frame and extending upwardly above the upper edges of said tank, oppositely-disposed inwardly-grooved vertical side-walls secured upon opposite edges of said bottom frame and between the adjacent upright pieces, cleats secured upon the upper edges of said side walls and to said adjacent upright pieces and resting upon the upper edge of said tank, whereby said bottom frame is held away from the bottom of the tank, and handle-bars secured to said upright pieces and connecting the adjacent upright pieces not connected by said cleats.

In testimony, that we claim the foregoing as our invention, we have signed our names in presence of two subscribing witnesses.

MANUEL GLASER.
BANY WAINBLATT.

Witnesses:
PAUL GOEPEL,
HENRY J. SUHRBIER.